United States Patent
Ziegler et al.

(10) Patent No.: US 6,470,692 B1
(45) Date of Patent: Oct. 29, 2002

(54) AIR RETURN BULKHEAD WITH FILTER

(75) Inventors: David B. Ziegler, Eden Prairie, MN (US); Verlin Wirth, Apple Valley, MN (US); Phillip R. Boudewyns, Apple Valley, MN (US); Ta Yang, St. Paul, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/008,687

(22) Filed: Nov. 8, 2001

(51) Int. Cl.$^7$ ................................................. B60H 1/32
(52) U.S. Cl. .............................. 62/89; 62/239; 454/118
(58) Field of Search ........................... 454/118; 62/239, 62/407, 419, 426, 89

(56) References Cited

U.S. PATENT DOCUMENTS

| | | | |
|---|---|---|---|
| ,941,443 A | 11/1909 | Faget | |
| 1,298,655 A | 4/1919 | Briner | |
| 1,506,904 A | 9/1924 | Harrison | |
| 1,716,867 A | 6/1929 | Simms | |
| 1,780,765 A | 11/1930 | O'Connor | |
| 1,847,861 A | 3/1932 | Bradbury | |
| 1,854,779 A | 4/1932 | Bringham, Jr. | |
| 2,119,905 A | 6/1938 | Crawford | 98/13 |
| 2,133,722 A | 10/1938 | Sisson | 105/376 |
| 2,238,700 A | 4/1941 | Lundvall | 62/19 |
| 2,260,999 A | 10/1941 | Mann | 98/6 |
| 2,316,265 A | 4/1943 | Lundvall | 62/19 |
| 2,332,034 A | 10/1943 | West | |
| 2,423,241 A | 7/1947 | Kurth et al. | 98/40 |
| 2,544,242 A | 3/1951 | Van Dorn et al. | 98/6 |
| 2,821,029 A | 1/1958 | Simons | 34/34 |
| 3,302,546 A | 2/1967 | Rath | 98/9 |
| 3,354,839 A | 11/1967 | Lich et al. | 105/376 |
| 3,651,659 A * | 3/1972 | Nakao et al. | 454/156 |
| 3,680,492 A | 8/1972 | Weage | 105/376 |
| 3,699,870 A | 10/1972 | Cantagallo et al. | 98/10 |
| D226,087 S | 1/1973 | Forsty et al. | D23/142 |
| 3,762,341 A | 10/1973 | Adler | 105/376 |
| 3,899,823 A | 8/1975 | Lambert | 29/455 |
| 3,918,271 A * | 11/1975 | Whisler | 165/41 |
| 3,922,959 A | 12/1975 | Treffers | 98/40 |
| 3,934,805 A | 1/1976 | Elaschuk | 248/346 |
| 3,942,419 A | 3/1976 | Beach | 98/40 |
| 3,949,522 A | 4/1976 | Kehl et al. | 47/17 |
| 3,988,973 A | 11/1976 | Honmann | 98/40 |

(List continued on next page.)

FOREIGN PATENT DOCUMENTS

GB 2228453 8/1990

OTHER PUBLICATIONS

A description of "A Patented Refrigerated Air Supply Control Delivery System for Road Transportation" dated Sep. 24, 1999.

A letter to Mr. Randall Gast dated Aug. 22, 2000 described an airflow system.

A letter to Mr. Bud Rodowick describing and showing the "Uni–Flow Side Mount Air Ducts" shown in the Nov. 1991 issue of "Refrigerated Transporter".

An advertisement published in the Nov. 1991 issue of "Refrigerated Transporter" showing "Uni–Flow Side Mount Air Ducts."

*Primary Examiner*—William E. Tapolcai
(74) *Attorney, Agent, or Firm*—Michael Best & Friedrich LLP

(57) ABSTRACT

An air return bulkhead having a filter for filtering dust, dirt and debris out of an airflow prior to its entry into an evaporator or heat exchanger. The apparatus is particularly designed for use within a climate-controlled space such as a trailer or truck interior. Air pulled into the refrigeration system first enters the air return bulkhead where particles and debris are filtered. The air then travels through the refrigeration system and back into the climate-controlled space.

14 Claims, 5 Drawing Sheets

U.S. PATENT DOCUMENTS

| | | | |
|---|---|---|---|
| D242,798 S | 12/1976 | Forsty et al. | D23/142 |
| D244,375 S | 5/1977 | Samuels et al. | D23/141 |
| 4,049,311 A | 9/1977 | Dietrich et al. | 296/24 |
| D250,661 S | 12/1978 | Anderson et al. | D23/142 |
| 4,132,088 A * | 1/1979 | Grosskopf | 62/239 |
| 4,143,588 A * | 3/1979 | Exler | 220/1.5 |
| D252,468 S | 7/1979 | Seipp | D23/142 |
| 4,161,145 A | 7/1979 | Patterson, III et al. | 105/376 |
| D258,233 S | 2/1981 | Taylor et al. | D23/142 |
| D258,234 S | 2/1981 | Anderson et al. | D23/142 |
| D266,870 S | 11/1982 | Allard et al. | D23/142 |
| 4,358,233 A | 11/1982 | Morris et al. | 410/127 |
| 4,362,091 A | 12/1982 | Cox | 98/40 |
| 4,399,737 A | 8/1983 | Severson | 98/6 |
| 4,432,213 A | 2/1984 | Katahira et al. | 62/239 |
| 4,448,041 A | 5/1984 | Southworth, Jr. | 62/268 |
| 4,531,377 A | 7/1985 | Zajic | 62/187 |
| 4,531,573 A | 7/1985 | Clark et al. | 165/16 |
| 4,549,405 A * | 10/1985 | Anderson et al. | 62/239 |
| 4,553,403 A | 11/1985 | Taylor | 62/239 |
| 4,565,071 A | 1/1986 | Bartling et al. | 62/89 |
| D283,437 S | 4/1986 | Neimy et al. | D23/142 |
| D287,619 S | 1/1987 | Allard et al. | D23/142 |
| 4,639,031 A | 1/1987 | Truckenbrodt | 296/24 |
| 4,658,598 A * | 4/1987 | Schulz | 165/41 |
| 4,726,196 A | 2/1988 | Zajic | 62/239 |
| 4,744,225 A | 5/1988 | Shoji et al. | 62/239 |
| 4,800,733 A | 1/1989 | Strobel et al. | 62/239 |
| 4,802,342 A * | 2/1989 | Gustafson et al. | 62/239 |
| 4,880,342 A | 11/1989 | Pradovic | 410/121 |
| 4,884,722 A | 12/1989 | Podd | 222/535 |
| 4,887,437 A | 12/1989 | Fenton et al. | 62/186 |
| D309,346 S | 7/1990 | Allard et al. | D23/325 |
| 4,979,431 A | 12/1990 | Fujimoto et al. | 98/6 |
| 5,044,259 A | 9/1991 | Catan et al. | 98/40.19 |
| 5,054,295 A | 10/1991 | Goulooze | 62/239 |
| 5,069,497 A | 12/1991 | Clelland | 296/155 |
| 5,111,739 A | 5/1992 | Hall | 454/306 |
| 5,129,235 A | 7/1992 | Renken et al. | 62/200 |
| 5,161,848 A | 11/1992 | Lutton | 296/24.1 |
| 5,187,945 A | 2/1993 | Dixon | 62/234 |
| 5,236,390 A | 8/1993 | Young | 454/95 |
| 5,295,905 A | 3/1994 | Simble | 454/286 |
| 5,315,846 A | 5/1994 | Lee | 62/419 |
| 5,319,941 A | 6/1994 | Schilling | 62/89 |
| 5,407,002 A | 4/1995 | Voll | 165/11.1 |
| 5,415,009 A | 5/1995 | Weiner et al. | 62/239 |
| 5,518,448 A | 5/1996 | Madoglio et al. | 454/108 |
| 5,704,676 A | 1/1998 | Hill | 296/24.1 |
| 5,769,704 A | 6/1998 | Henning et al. | 454/118 |
| 5,807,046 A | 9/1998 | Onken | 410/129 |
| 5,830,057 A | 11/1998 | Hunt, Jr. | 454/118 |
| 5,946,933 A | 9/1999 | Clarke et al. | 62/408 |
| 5,993,310 A | 11/1999 | Onken | 454/118 |
| 6,206,775 B1 * | 3/2001 | Lemaitre et al. | 139/158 |

* cited by examiner

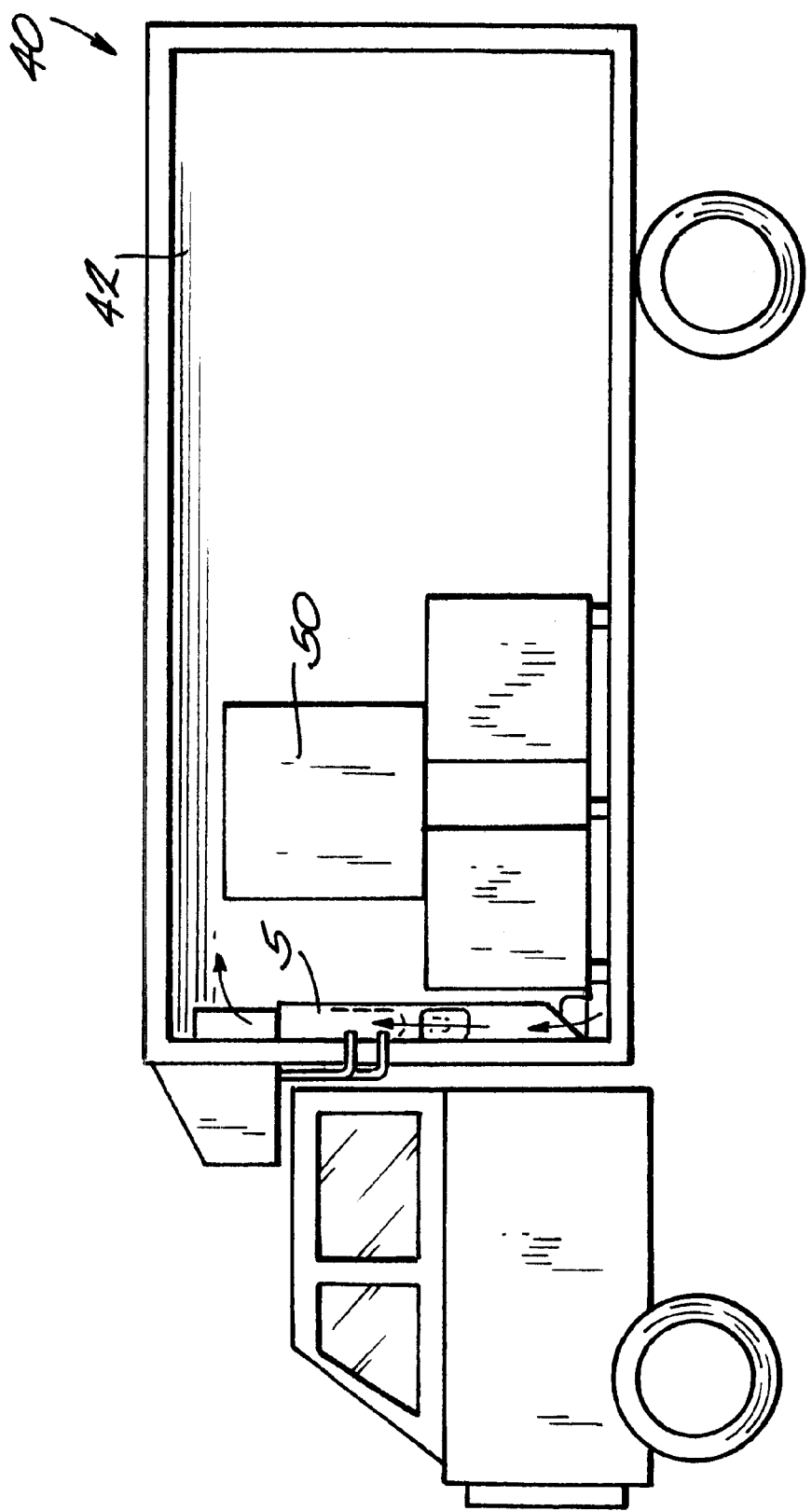

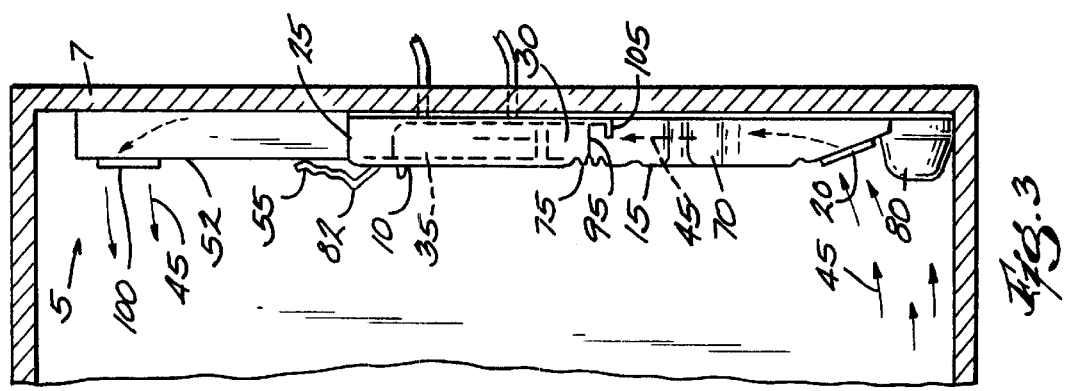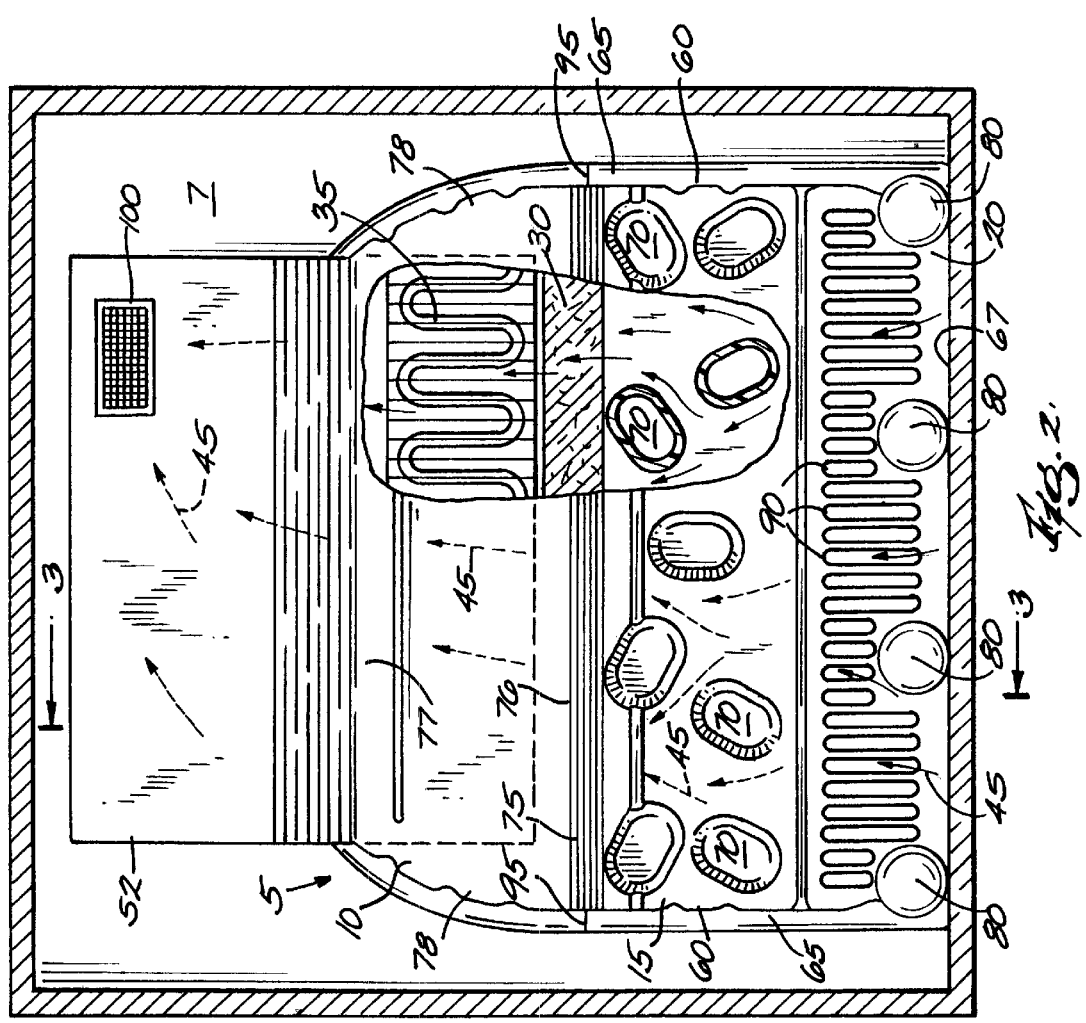

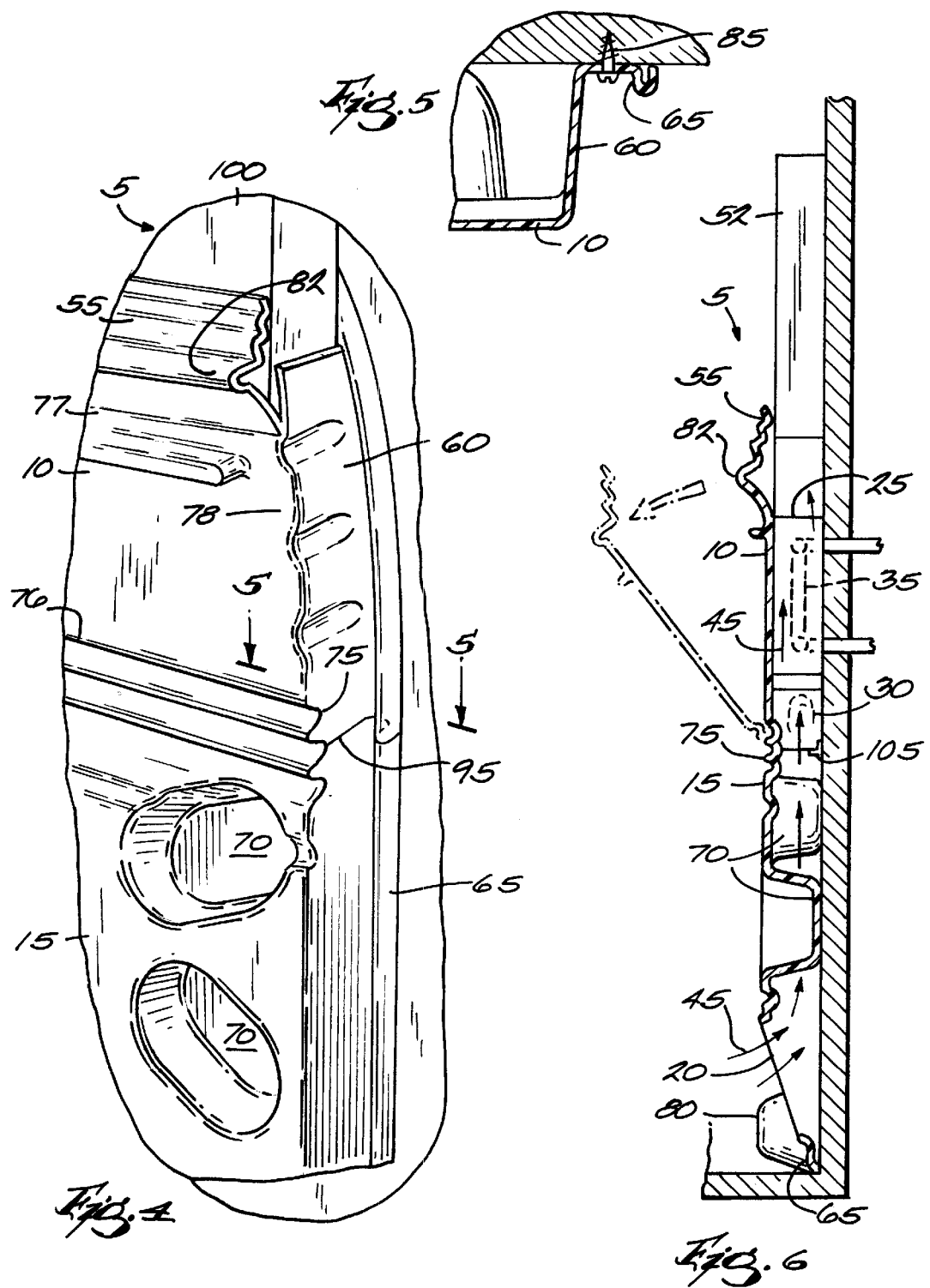

AIR RETURN BULKHEAD WITH FILTER

FIELD OF THE INVENTION

The invention relates generally to refrigeration systems used to cool or heat a confined space and, more specifically, to bulkheads used to direct cooled or heated air in a confined space on a vehicle capable of transporting goods.

BACKGROUND OF THE INVENTION

Air return bulkheads of the type described herein provide a flow path for air through a climate-controlled space within a vehicle, while simultaneously protecting the refrigeration equipment from damage. The air from within the controlled space of the vehicle enters the bulkhead through an inlet and travels to the refrigeration system where it is heated or cooled before returning to the controlled space.

SUMMARY OF THE INVENTION

Dirt and debris that collects on the floor can be pulled into the bulkhead and can contaminate the refrigeration system. Dirt and debris entering the refrigeration system can lodge within the evaporator, eventually reducing the air flow substantially. Some systems will interpret the blockage as ice and will cycle the refrigeration system into defrost mode, which is ineffective at removing the debris. The system will therefore operate inefficiently until it is cleaned manually, or it will continuously cycle into defrost mode until an alarm is generated and the system shuts down.

The air return bulkhead of the present invention includes a plurality of walls defining a climate-controlled space such as a truck trailer. A refrigeration system supplies cold or heated refrigerant to an evaporator. The evaporator has a refrigerant flow path for refrigerant and an air flow path for air from the climate-controlled space. The evaporator thus uses refrigerant to cool or heat air, and the air then flows back into the climate-controlled space to heat or cool the goods therein.

The air return bulkhead is attached to one of the walls defining the climate-controlled space, substantially covering the inlet of the evaporator airflow path. The bulkhead has a hinged cover that allows easy access to a filter located within the bulkhead. In addition, the bulkhead has an air inlet and an air exhaust. When the refrigeration system is operating, air from the climate-controlled space is pulled into the air return bulkhead air inlet, passes through the filter, and then enters the evaporator air flow path. After being cooled by the evaporator, the air exits the system through the air exhaust and reenters the climate-controlled space.

Other features and advantages of the invention will become apparent to those skilled in the art upon review of the following detailed description, claims, and drawings.

BRIEF DESCRIPTION OF THE DRAWINGS

FIG. 1 is an illustration of a truck having the return air bulkhead of the present invention within the rear cargo space;

FIG. 2 is a front view of an air return bulkhead mounted to a wall of a truck;

FIG. 3 is a section view of the air return bulkhead of FIG. 2 showing the air flow path through the filter;

FIG. 4 is a partial perspective view of one side of the air return bulkhead showing the cuts made through the side panels and mounting panels;

FIG. 5 is a partial section view showing a fastener securing the bulkhead to the wall;

FIG. 6 is a section view similar to that of FIG. 3 with the top panel shown in the open and closed positions;

DETAILED DESCRIPTION OF THE PREFERRED EMBODIMENTS

Figure 7:
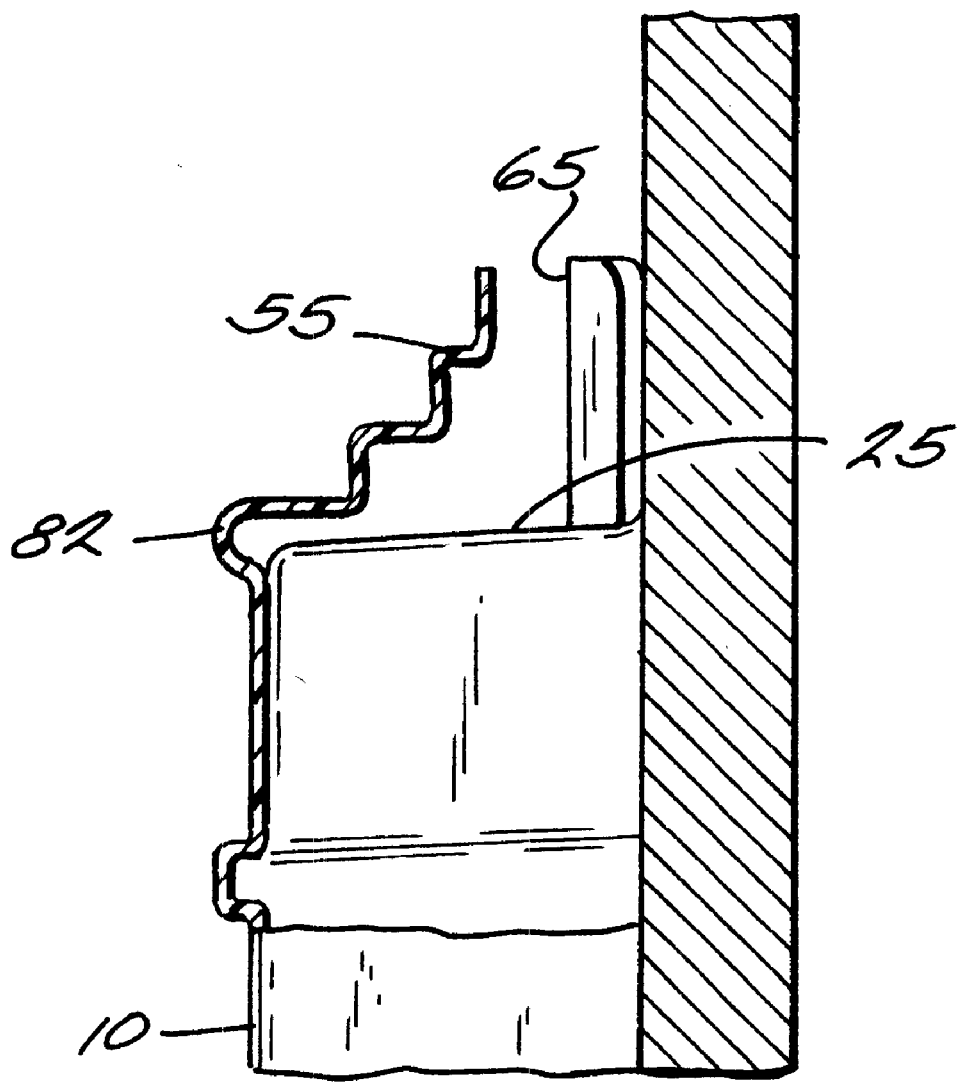
FIG. 7 is a section view showing an upper flap before installation on a wall.

Referring to FIG. 2, a front view of an air return bulkhead 5 of the present invention is shown mounted to a wall 7. The air return bulkhead 5 comprises a top panel 10, a front panel 15, an inlet panel 20, an air outlet 25 (shown in FIG. 3), and a filter 30. Also shown in FIG. 2 is an evaporator 35 consistent with a typical refrigeration system. A preferred embodiment of the system controls the climate of the interior of a mobile truck trailer 40 such as the one illustrated in FIG. 1. The truck trailer 40 has a plurality of walls defining a climate-controlled space 42.

Refrigeration systems typically include a compressor, a condenser, a reservoir, and a plurality of fans. In addition, typical refrigeration systems require an evaporator 35 as shown in FIG. 2. Cryogen refrigeration systems eliminate many of these components but still require an evaporator in the form of a heat exchanger. The invention will function well with cryogen refrigeration systems. However, for simplification, a vapor-compression refrigeration system will be described. One having ordinary skill in the art will recognize that the actual refrigeration cycle used is of little importance to the function of the invention. The invention will inhibit dirt and debris from entering an evaporator or other type of heat exchanger. As used herein, the terms evaporator, and heat exchanger are interchangeable. An evaporator shall include any suitable heat exchanger and a heat exchanger shall include any suitable evaporator.

In a standard refrigeration cycle, refrigerant compressed in the compressor flows through a condenser where it is cooled and condensed. The condensed refrigerant then passes through an expansion valve where it vaporizes and cools. The refrigerant then flows through the evaporator 35 where it cools the warm fluid. The refrigerant then proceeds back to the compressor. One or more evaporator fans (not shown) draw warm air from the climate-controlled space into the evaporator 35. The warm air flow 45 enters through the return air bulkhead 5, flows across the evaporator and then returns to the climate-controlled space 42.

The primary purpose of an air return bulkhead is to aid the refrigeration system in drawing air from the bottom of the trailer. In addition, air return bulkheads 5 of the type described herein inhibit damage to the front of the trailer 40 and the refrigeration equipment. Without the air return bulkhead 5, shifting cargo 50 can strike the front trailer wall and the refrigeration unit 52 during transportation. The bulkhead 5 protects the refrigeration unit 52 while maintaining flow pathways for return air along the front wall of the trailer 40 and into the evaporator 35.

Air return bulkheads 5 of the type shown in FIG. 2 are commonly manufactured as one continuous piece from high-density polyethylene. The bulkhead 5 has a top panel 10 and a front panel 15 spaced apart a distance from the wall of the trailer 40. An upper flap 55 coupled to the top panel 10, and a pair of side panels 60 coupled to the top and front panels, 10 and 15 respectively, extend from the top panel 10 and front panel 15, towards the rear of the truck 40. The side panels 60 each attach to a corresponding side mounting panel 65. Coupled to the front panel 15 is the inlet panel 20, which extends below the front panel 15 forming the inlet to the bulkhead 5. A bottom mounting panel 67 attaches to the inlet panel 20 at the lower most point of the bulkhead 5. In addition to the above-mentioned features, other integrally molded features include stand-offs 70, a stepped hinge 75, and several pallet stops 80.

The front panel 15 of the bulkhead 5 is generally rectangular and forms a large portion of the front of the completed bulkhead 5. The stand-offs 70 are molded into the front panel 15 of the bulkhead 5. Attached to the front panel 15 at the hinge 75 is the top panel 10. The top panel 10 has four edges, a bottom edge 76, a top edge 77, and two side edges 78. The bottom edge 76 attaches to and is the same length as the hinge 75. The top edge 77 attaches the top panel 10 to the upper flap 55. The upper flap 55 is sized to have a width approximately equal to the width of the refrigeration unit 52. As shown in FIG. 2, the refrigeration unit width is less than the width of the front panel 15. Therefore, the top edge 77 of the top panel 10 is shorter than the bottom edge 76. The two side edges 78 of the top panel 10 are arcuate in nature, allowing the larger bottom edge 76 to connect to the shorter top edge 77. The two side panels 60 begin at the inlet panel 20 and extend the full length of the bulkhead 5 on either side along the front panel 15 and the top panel 10. Each side panel 60 follows the curve of the top panel 10 side edges 78 ending at the end points of the top edge 77. The side panels 60 and top panel 10 thus define an opening that is sized to receive the refrigeration unit 52. The opening width is approximately equal to the width of the refrigeration unit 52. In addition, the upper flap 55 is bendable about a bending joint 82 such that it is in contact with the surface of the refrigeration unit 52, as shown in FIGS. 4 and 6.

As is best illustrated in FIG. 5, the bulkhead 5 attaches to the trailer 40 by way of a plurality of fasteners 85 passing through the mounting panels 65. The side mounting panels 65 and bottom mounting panel 67 mount flush against the trailer 40 providing a seal therebetween. Screws, bolts, or studs are suitable fasteners 85 for attaching the bulkhead 5 securely to the trailer wall 7. In addition, a gasket (not shown) can be used between the trailer wall 7 and the bulkhead 5 if an improved seal is required. However, the invention will function properly with or without a gasket.

Referring now to FIGS. 2 and 3, the inlet panel 20 located near the bottom of the bulkhead 5 allows return air to enter the bulkhead 5. A plurality of elongated apertures 90, provided in the inlet panel 20, allow for the flow of air therethrough. The inlet panel 20 slopes down and forward (toward the trailer wall 7) until it meets the bottom mounting panel 67. While elongated apertures 90 have been described and illustrated, any shape aperture 90 will function so long as sufficient air can flow into the bulkhead 5.

Within the inlet panel 20 are several rounded projections or pallet stops 80. The pallet stops 80 extend away from the trailer wall to a location slightly beyond the remainder of the bulkhead 5. The pallet stops 80 serve as bumpers, preventing pallets or cargo 50 from striking or shifting into the remainder of the bulkhead 5. The pallet stops 80 are preferably dome shaped features with a slightly flattened top surface. A round cross-section eliminates potential stress risers created by sharp corners, simplifying the manufacturing process. While a round cross-section has been described, other shapes (e.g., oval) will function as pallet stops 80 and not adversely affect the invention. In addition, separate pieces attached to the trailer wall 7 or to the bulkhead 5 could serve as pallet stops 80.

Several stand-offs 70 are formed within the front panel 15. The illustrated stand-offs 70 are oval or circular projections that extend from the front panel 15 towards the trailer wall. The stand-offs 70 support the front panel 15 in a plane away from the trailer wall allowing the front panel 15 to be thin and flexible while preventing its collapse due to the slightly lower air pressure within the bulkhead 5. Again, rounded features having no sharp corners are preferred due to the manufacturing advantages. However, any shape protrusion (e.g., round) will function as a stand-off 70. In fact, separate pieces placed between the bulkhead 5 and trailer wall 7 or extending through the trailer wall 7 will also perform adequately as stand-offs 70.

The top panel 10 attaches to the front panel 15 using a stepped hinge 75. The stepped hinge 75 is a formation having a serpentine cross-section that allows the top panel 10 to pivot out of the plane of the front panel 15. In the hinge's non-stressed position, the top panel 10 and the front panel 15 are substantially coplanar. In order for the top panel 10 to pivot about the hinge 75, the top panel 10 must be separated from the front panel 15 and the side panels 60 must be separated at the hinge 75. To facilitate this movement, two cuts 95 are made from the hinge 75 on either side through the side panels 60 and side mounting panels 65. The cuts 95, as illustrated in FIG. 4, are in a plane that is substantially perpendicular to the plane of the front panel 15 and extends through the hinge pivot axis. The cuts 95 free the top panel 10 from the front panel 15, allowing the top panel 10 and the upper flap 55 to pivot. The pivoting top panel 10, when in its open position as shown in broken lines in FIG. 6, allows easy access to the interior of the air return bulkhead 5. In normal operation, the mounting surfaces 65 that are coupled to the top panel 10 are rigidly attached to the wall 7 preventing the top panel 10 from moving. To allow movement, the mounting apparatus (e.g., fasteners 85) must be removed or disengaged at all locations above the cuts 95. For example, the fasteners could be quarter-turn fasteners that can be removed by hand, without the use of tools. Once removed, the top panel 10 and upper flap 55 along with the portions of the side panels 60 and mounting panels 65 above the cuts 95 can rotate about the hinge 75.

The upper flap 55, best illustrated in FIGS. 3–4, and 6–8, is a flexible piece of material which in its static position partially covers the bulkhead air outlet 25, and in its flexed position abuts the surface of the refrigeration unit 52. A bending joint 82, best shown in FIGS. 4 and 7, couples the upper flap 55 to the top panel 10. The bending joint 82 is shaped to allow movement of the upper flap 55 between its static and flexed positions without causing damage to the upper flap 55 or the top panel 10. Referring to FIG. 7, the upper flap 55 includes several stepped portions in addition to the bending joint 82. The stepped portions increase the flexibility of the upper flap 55 allowing it to flex, as shown in FIG. 6, to accommodate the refrigeration unit 52.

Figure 8:
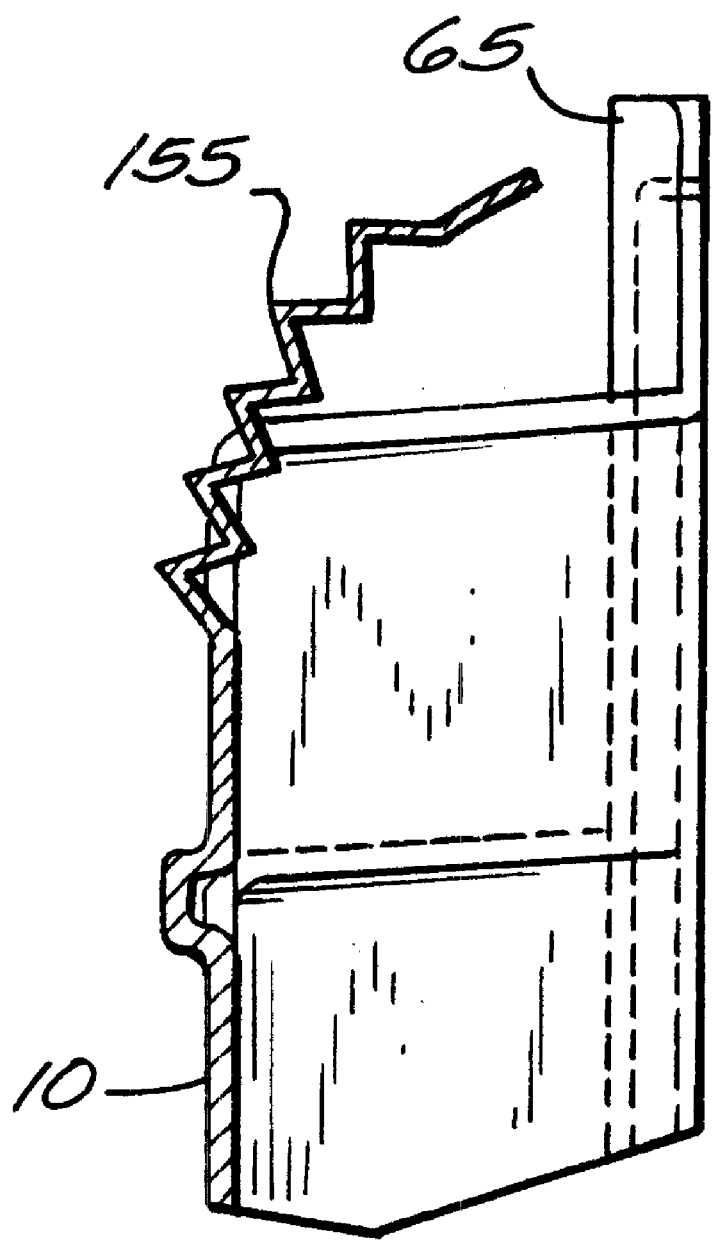
FIG. 8 is a section view of another embodiment of the upper flap.

In another embodiment of the upper flap, illustrated in FIG. 8, the material thickness of the flap 155 is reduced when compared to the material thickness of the top panel 10. The reduced material thickness significantly increases the flexibility of the upper flap 155, improving its contact with the refrigeration unit 52. The increased flexibility of the upper flap 155 achieved using thinner material and a stepped portion allows the upper flap 155 to contact and thus accommodate refrigeration units 52 of varying thickness. The upper flap 155 "rolls back" an amount that is dependent on the thickness of the refrigeration unit 52 being used. For example, a thin refrigeration unit 52 will cause only a small amount of distortion or "roll back" in the upper flap 155 while a thick refrigeration unit 52 requires significantly more roll back. In addition to reducing the material thickness to improve flexibility, additional flexibility can be achieved by increasing the number of steps in the stepped portion and is thus contemplated by the present invention.

Due to the location of the inlet panel 20 near the trailer floor, dust, dirt, or other debris is easily sucked into the air return bulkhead 5, potentially clogging the air flow path 45 through the evaporator 35. In an effort to prevent clogging of the evaporator 35, some air return bulkheads 5 employ a screen (not shown) at the air inlet 20. The screen typically consists of a large mesh and is therefore only capable of stopping relatively large objects. Smaller objects can still enter and clog the evaporator 35, reducing its efficiency and potentially causing the control system to initiate a defrost cycle or even shutdown the cooling unit.

To improve the cleanliness of the evaporator 35, the present invention employees a filter 30 located between the inlet panel 20 and the bulkhead air outlet 25. The filter 30 is capable of stopping small particles, thus preventing clogging of the evaporator 35. In addition, the filter 30 is easily changeable and inexpensive when compared to the cost of manually cleaning an evaporator 35.

As is best illustrated in FIGS. 3 and 6, airflow 45 within the bulkhead 5 enters the inlet panel 20 at the lowermost portion of the bulkhead 5. The air passes behind the front panel 15 to the lower surface of the filter 30. The filter 30 is located such that it extends the full length of the bulkhead 5 and extends from the bulkhead inner surface to the trailer wall 7. The air must therefore pass through the filter 30 before entering the evaporator 35. The air enters the lower portion of the filter 30, passes through the filter 30 where fine particles, dust, dirt, and debris are removed, and then enters the evaporator 35.

The upper flap 55 contacts a portion of the front of the evaporator 35 to inhibit air from passing in front of the evaporator 35 directly to the bulkhead air outlet 25. In some cases, the evaporator 35 does not extend into the trailer 40 enough to allow air tight contact between the upper flap 55 and the evaporator 35. In this case, a fill material (not shown) placed between the top panel 10 or the upper flap 55 and the evaporator 35 can be used to provide the necessary seal, between the bulkhead 5 and the evaporator 35.

The above-described arrangement provides several advantages, including the ease with which the filter 30 can be inspected and replaced. The hinged top panel 10 opens to expose not only the evaporator 35 but also at least a portion of the filter 30, allowing inspection and replacement without removing the bulkhead 5. In addition, the filter position assures that air entering the bulkhead 5 through the inlet panel 20 is filtered before it enters the evaporator 35. Another advantage of the above-described arrangement is the ability to treat the air as it is filtered. For example, the filter 30 can be treated with anti-fungal or anti-bacterial agents. As the air is filtered, these agents serve to further purify and clean the air.

In a preferred embodiment, the filter 30 is supported by a series of "L" shaped brackets 105. The brackets 105 attach to the vehicle wall using any known means including welding, bolting, screwing, or adhesives, and the like. The filter 30 rests on the "L" shaped brackets 105. In another embodiment, the filter 30 is supported within the bulkhead 5 by sandwiching it between the air return bulkhead 5 and the vehicle wall. The uppermost stand-offs 70 or other structural features of the bulkhead can also be used to support the filter 30.

Many different types of filter media are available and will function successfully in this application. For example, Blue Dacron, Pink Dacron, or White Dacron will function as filter media. In a preferred embodiment, a natural fiber filter media such as "Hogs Hair" is used. The natural fiber has several advantages over the synthetic fibers including being inexpensive. In addition, natural fibers are less likely to freeze.

The filter media chosen should also be resistant to moisture damage. During the defrosting process, water from the evaporator 35 can potentially enter the filter 30. In addition, condensate can form on the internal components when the cooled space is exposed to hot, humid conditions common outside of the climate-controlled space 42. This moisture could flow into the filter 30 causing damage if the filter media is not resistant to water damage. Finally, truck trailers 40 are often cleaned between loads using water. This water can easily enter the filter 30 during the cleaning process given the proximity of the inlet panel 20 to the floor. It is therefore desirable to use a filter 30 that will not be damaged by water.

Although particular embodiments of the present invention have been shown and described, other alternative embodiments will be apparent to those skilled in the art and are within the intended scope of the present invention. Thus, the present invention is to be limited only by the following claims.

What is claimed is:

1. A mobile refrigeration unit comprising:
   a container having a plurality of walls defining a climate-controlled space;
   a refrigeration system coupled to the container and including an air inlet;
   an air return bulkhead coupled to at least one of the plurality of walls and defining an air flow path in fluid communication with the air inlet; and
   a filter disposed in the air flow path, wherein air from the climate-controlled space enters the bulkhead and flows through the filter into the air inlet;
   wherein the bulkhead includes a lower portion and an upper portion movable relative to the lower portion for accessing the filter.

2. The mobile refrigeration unit of claim 1, further comprising at least one bracket coupled to one of the plurality of walls, said bracket supporting the filter within the bulkhead.

3. The mobile refrigeration unit of claim 1, wherein the filter is removable from the bulkhead by pivoting the upper portion relative to the lower portion.

4. The mobile refrigeration unit of claim 1, further comprising a heat exchanger having a heat exchanger housing that protrudes a distance from the vehicle wall into the climate-controlled space, and wherein the bulkhead includes an upper flap that abuts the heat exchanger housing.

5. The mobile refrigeration unit of claim 4, wherein the upper flap is movable relative to the rest of the bulkhead.

6. The mobile refrigeration unit of claim 4, wherein the upper flap includes a plurality of stepped portions.

7. An air return bulkhead adapted to be mounted to a wall in a climate-controlled space, the bulkhead comprising:
   a bulkhead defining an air flow path; and
   a filter disposed in the air flow path;
   wherein air from the climate-controlled space can enter the bulkhead and flow through the filter, and wherein the bulkhead includes a lower portion and an upper portion movable relative to the lower portion to access the filter.

8. The air return bulkhead of claim 7, further comprising at least one bracket adapted to be coupled to the wall, said bracket supporting the filter within the bulkhead.

9. The air return bulkhead of claim 7, wherein the filter is removable from the bulkhead by pivoting the upper portion relative to the lower portion.

10. The air return bulkhead of claim 10, further comprising a heat exchanger having a heat exchanger housing that protrudes a distance from the wall, and wherein the bulkhead includes an upper flap that abuts the heat exchanger housing.

11. The air return bulkhead of claim 10, wherein the upper flap is movable relative to the rest of the bulkhead.

12. The air return bulkhead of claim 10, wherein the upper flap includes a plurality of stepped portions.

13. A method of treating air in a climate-controlled space defined by a plurality of walls and including a heat exchanger, the method comprising the steps of:

providing an air return bulkhead having an air inlet in fluid communication with the climate-controlled space, and a filter in fluid communication with the air inlet;

inducing an air flow from the climate-controlled space into the air inlet;

passing the air flow through the filter;

passing the air flow through the heat exchanger;

returning the air to the climate-controlled space; and removing the filter and replacing the filter;

wherein the removing step includes moving an upper portion of the bulkhead to access the filter.

14. The method of claim 13, wherein the moving step includes maintaining the lower portion of the bulkhead substantially fixed to the wall.

* * * * *